(12) United States Patent
Gappa et al.

(10) Patent No.: US 9,874,705 B2
(45) Date of Patent: Jan. 23, 2018

(54) OPTICAL WAVEGUIDE MODULE

(71) Applicant: FUJITSU COMPONENT LIMITED, Tokyo (JP)

(72) Inventors: Rie Gappa, Tokyo (JP); Osamu Daikuhara, Tokyo (JP); Shinichiro Akieda, Tokyo (JP); Satoshi Moriyama, Tokyo (JP); Hongfei Zhang, Tokyo (JP); Mitsuki Kanda, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/427,557

(22) Filed: Feb. 8, 2017

(65) Prior Publication Data
US 2017/0146753 A1 May 25, 2017

Related U.S. Application Data

(62) Division of application No. 15/012,987, filed on Feb. 2, 2016, now Pat. No. 9,599,773.

(30) Foreign Application Priority Data

Feb. 6, 2015 (JP) .................................. 2015-022621

(51) Int. Cl.
*H04B 10/00* (2013.01)
*G02B 6/42* (2006.01)
*G02B 6/12* (2006.01)

(52) U.S. Cl.
CPC ........... *G02B 6/422* (2013.01); *G02B 6/4214* (2013.01); *G02B 6/4222* (2013.01);
(Continued)

(58) Field of Classification Search
CPC ........ G02B 6/34; G02B 6/325; G02B 6/4214; G02B 6/422; G02B 6/4221; G02B 6/4222;
(Continued)

(56) References Cited

U.S. PATENT DOCUMENTS 4,378,143 A * 3/1983 Winzer ................ G02B 6/2852
385/33
5,563,901 A 10/1996 Otoma et al.
(Continued)

FOREIGN PATENT DOCUMENTS

JP 2009-069360 4/2009

OTHER PUBLICATIONS

Office Action dated Apr. 20, 2017 issued with respect to the related U.S. Appl. No. 15/427,519.

*Primary Examiner* — Robert Tavlykaev
(74) *Attorney, Agent, or Firm* — IPUSA, PLLC

(57) ABSTRACT

An optical waveguide module includes an optical waveguide sheet including multiple optical waveguides, and a light-emitting device and a light-receiving device each positioned over a surface of the optical waveguide sheet. At least one of the optical waveguides includes a first mirror, a second mirror, and a slit. The first mirror is configured to reflect light entering the corresponding optical waveguide from its first end to the light-receiving device or to reflect light emitted from the light-emitting device toward the first end of the corresponding optical waveguide. The second mirror is configured to reflect light entering the corresponding optical waveguide from its second end toward the surface of the optical waveguide sheet. The slit is provided between the second mirror and the second end of the corresponding optical waveguide. The corresponding optical waveguide is discontinuous across the slit.

2 Claims, 21 Drawing Sheets

(52) U.S. Cl.
CPC ......... *G02B 6/4224* (2013.01); *G02B 6/4227* (2013.01); *G02B 2006/12104* (2013.01)

(58) Field of Classification Search
CPC ... G02B 6/4224; G02B 6/4225; G02B 6/4227
USPC ...... 385/14, 88, 89; 398/139, 200, 201, 212, 398/214
See application file for complete search history.

(56) References Cited

U.S. PATENT DOCUMENTS

| | | | |
|---|---|---|---|
| 5,932,114 A * | 8/1999 | Makiuchi | H01L 31/02325 216/24 |
| 6,404,960 B1 * | 6/2002 | Hibbs-Brenner | G02B 6/26 385/49 |
| 7,174,057 B2 | 2/2007 | Shimizu et al. | |
| 7,183,759 B1 * | 2/2007 | Malendevich | G02B 6/12007 324/750.22 |
| 7,781,236 B2 | 8/2010 | Suzuki et al. | |
| 8,249,404 B2 | 8/2012 | Fujii et al. | |
| 8,406,585 B2 | 3/2013 | Ushiwata et al. | |
| 8,422,836 B2 * | 4/2013 | Riester | G02B 6/138 385/14 |
| 9,225,428 B1 * | 12/2015 | Peng | H04Q 11/0005 |
| 2002/0003824 A1 | 1/2002 | Lo et al. | |
| 2002/0044720 A1 | 4/2002 | Brophy et al. | |
| 2003/0113067 A1 | 6/2003 | Koh et al. | |
| 2008/0232752 A1 * | 9/2008 | Watanabe | H01L 24/73 385/123 |
| 2009/0028497 A1 | 1/2009 | Kodama et al. | |
| 2009/0322343 A1 * | 12/2009 | Patterson | G01R 31/311 324/501 |
| 2012/0019916 A1 * | 1/2012 | Shoki | B82Y 10/00 359/586 |
| 2012/0076454 A1 * | 3/2012 | Shiraishi | G02B 6/42 385/14 |
| 2015/0153523 A1 * | 6/2015 | Mizuno | G02B 6/4221 29/833 |

* cited by examiner

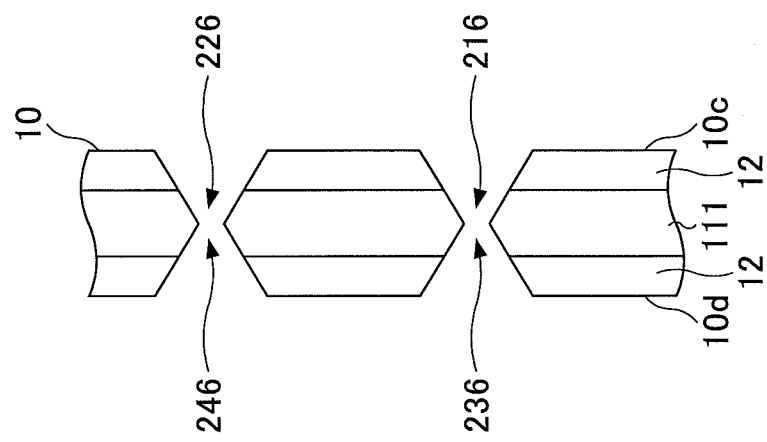
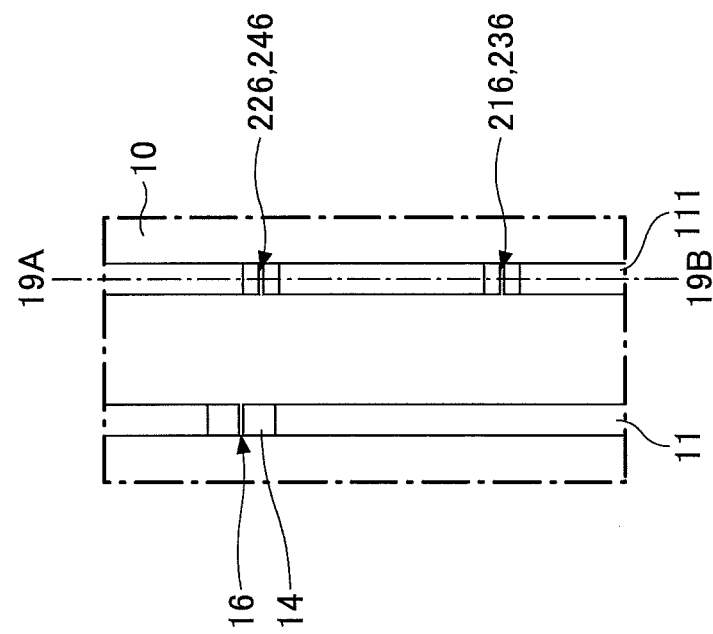

OPTICAL WAVEGUIDE MODULE

CROSS-REFERENCE TO RELATED APPLICATION

The present application is a division of U.S. patent application Ser. No. 15/012,987, filed on Feb. 2, 2016, which is based upon and claims priority to Japanese Patent Application No. 2015-022621, filed on Feb. 6, 2015. The disclosures of the prior applications are hereby incorporated herein in their entirety by reference.

BACKGROUND OF THE INVENTION

1. Field of the Invention

The present invention relates to optical waveguides.

2. Description of the Related Art

Optical waveguide modules for optical communications, in which a light-emitting device and a light-receiving device are provided on an optical waveguide, are known. Such optical waveguide modules are manufactured by joining a light-emitting device and a light-receiving device to optical waveguides after aligning the light-emitting device and the light-receiving device relative to the optical waveguides so that light from the light-emitting device enters the optical waveguide and light from the optical waveguide enters the light-receiving device. Reference may be made to Japanese Laid-Open Patent Application No. 2009-69360 for related art.

SUMMARY OF THE INVENTION

According to an aspect of the present invention, an optical waveguide module includes an optical waveguide sheet including a plurality of optical waveguides, a light-emitting device positioned over a surface of the optical waveguide sheet, and a light-receiving device positioned over the surface of the optical waveguide sheet. At least one of the plurality of optical waveguides includes a first mirror configured to reflect light entering the corresponding optical waveguide from a first end thereof to the light-receiving device or to reflect light emitted from the light-emitting device toward the first end of the corresponding optical waveguide, a second mirror configured to reflect light entering the corresponding optical waveguide from a second end thereof opposite to the first end toward the surface of the optical waveguide sheet, and a slit provided between the second mirror and the second end of the corresponding optical waveguide. The corresponding optical waveguide is discontinuous across the slit.

According to an aspect of the present invention, an optical waveguide module includes an optical waveguide sheet including a plurality of optical waveguides, a light-emitting device positioned over a first surface of the optical waveguide sheet, a light-receiving device positioned over the first surface of the optical waveguide sheet, a first mirror formed in at least one of the plurality of optical waveguides and configured to reflect light entering from a second surface of the optical waveguide sheet opposite to the first surface toward the optical waveguide, and a second mirror formed in the optical waveguide and configured to reflect the light reflected from the first mirror and propagating through the optical waveguide toward the first surface of the optical waveguide sheet.

According to an aspect of the present invention, an optical waveguide module includes an optical waveguide sheet including a plurality of optical waveguides, a light-emitting device positioned over a surface of the optical waveguide sheet, a light-receiving device positioned over the surface of the optical waveguide sheet, a mirror formed in at least one of the plurality of optical waveguides, the mirror being configured to reflect light propagating through the optical waveguide toward the surface of the optical waveguide sheet, and a recognition mark provided on the mirror.

BRIEF DESCRIPTION OF THE DRAWINGS

FIGS. 19A and 19B are diagrams illustrating the optical waveguide sheet according to the third embodiment;

DESCRIPTION OF THE EMBODIMENTS

Figure 1:
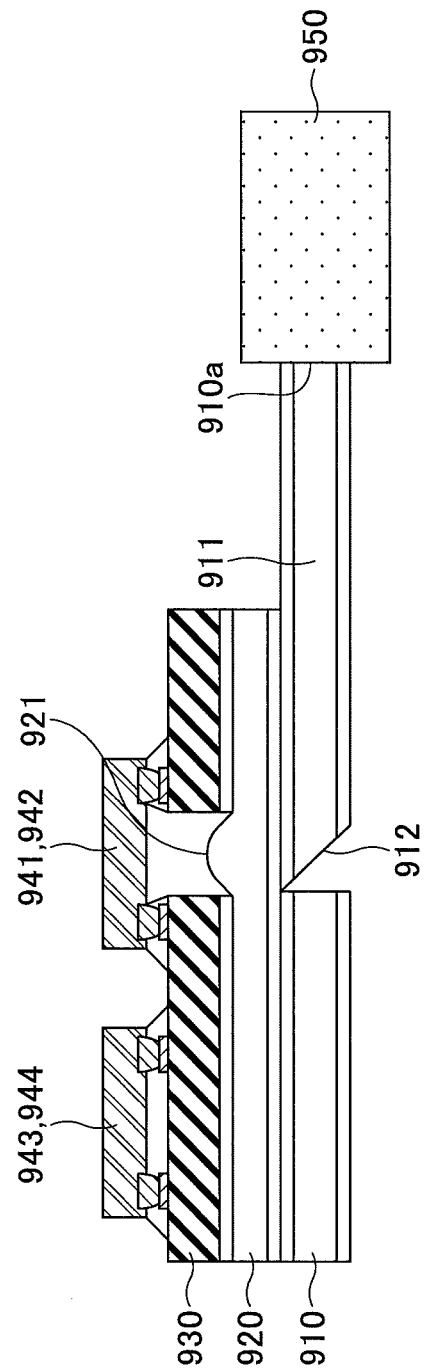
FIG. 1 is a diagram illustrating a structure of an optical waveguide module.

According to an aspect of the present invention, it is possible to provide an optical waveguide module including optical waveguides provided with a light-emitting device and a light-receiving device that can be manufactured at low cost and obtain desired characteristics.

Embodiments of the present invention are described below. The same elements are referred to by the same reference numeral, and are not repeatedly described.

Figure 2:
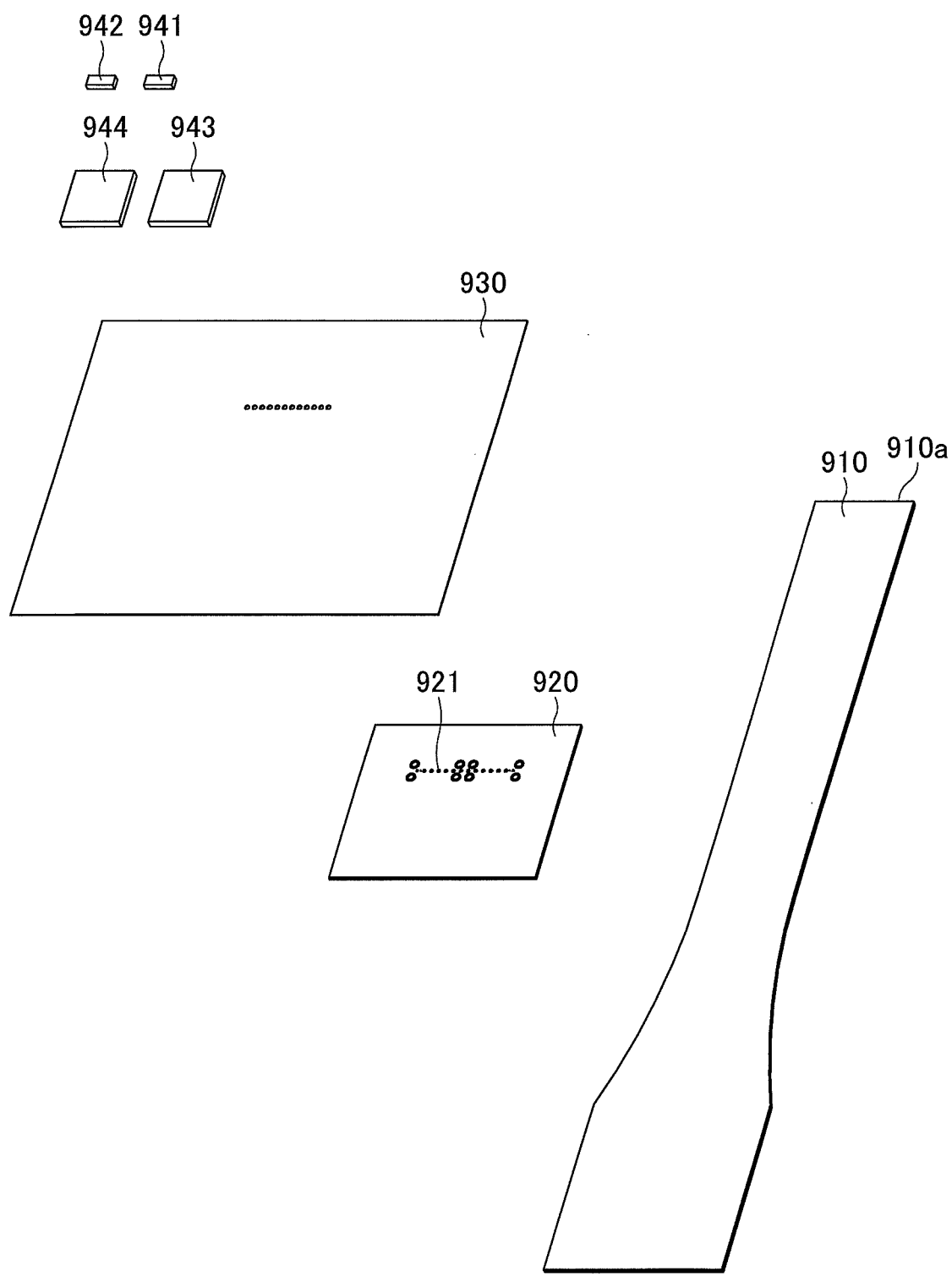
FIG. 2 is an exploded perspective view of the optical waveguide module.
Figure 3:
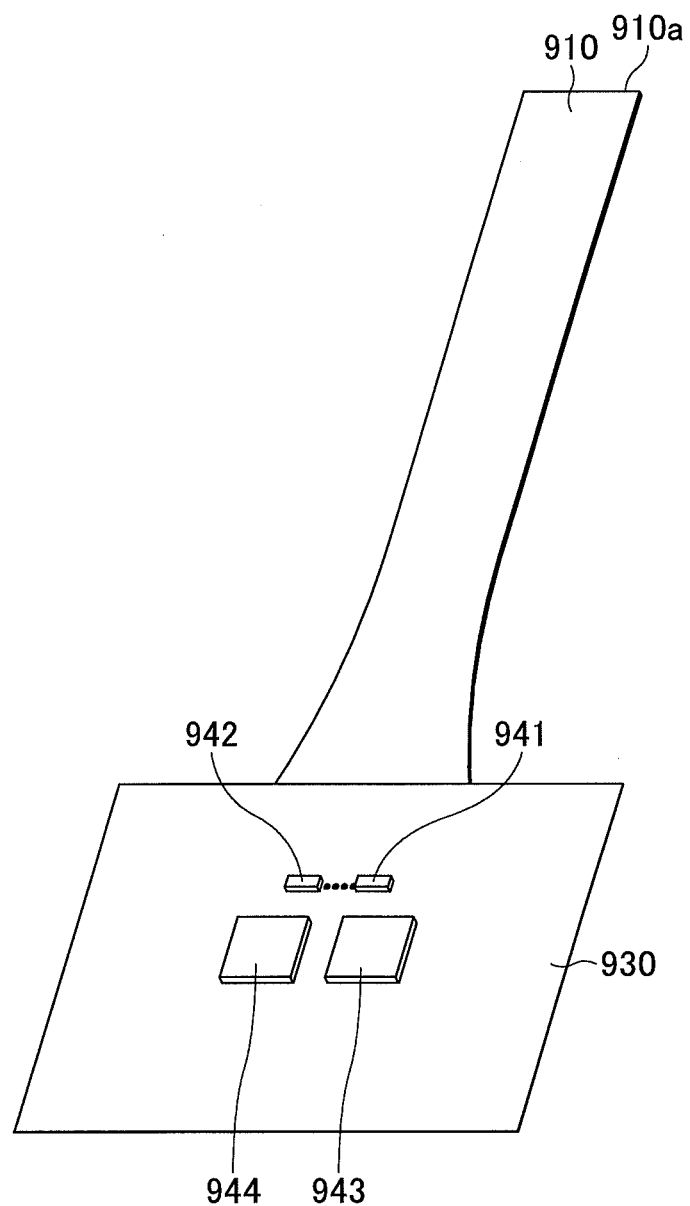
FIG. 3 is a perspective view of the optical waveguide module.

First, the mounting of a light-emitting device and a light-receiving device on optical waveguides in manufacturing an optical waveguide module is described with reference to FIGS. 1 through 3. Referring to FIGS. 1 through 3, an optical waveguide module is manufactured by stacking a lens sheet 920 and a flexible substrate 930 on an optical waveguide sheet 910 and joining the lens sheet 920, the flexible substrate 930, and the optical waveguide sheet 910 together. A light-emitting device 941 such as a vertical cavity surface emitting laser (VCSEL), a light-receiving device 942 such as a photodiode (PD), a driver 943 that drives the light-emitting device 941, and a transimpedance amplifier (TIA) 943 that amplifies a signal from the light-receiving device 942 are mounted on the flexible substrate 930 by flip-chip bonding.

Optical waveguides 911 are arranged in a width direction of the optical waveguide sheet 910. A mirror 912 is formed in each optical waveguide 911 so as to cause light emitted from the light-emitting device 941 to enter the optical waveguide 911 or cause light in the optical waveguide 911 to enter the light-receiving device 942. Lenses 921 are provided in the lens sheet 920 so as to be positioned between the optical waveguide sheet 910 and the flexible substrate 930. A ferrule 950 with lenses for inputting light to optical waveguides 911 and outputting light from optical waveguides 911 is connected to an end 910a of the optical waveguide sheet 910.

The optical waveguide sheet 910, the lens sheet 920, the light-emitting device 941, and the light-receiving device 942 are desired to be aligned and joined, so that light entering optical waveguides 911 is vertically reflected relative to the surface of the optical waveguide sheet 910 by the mirrors 912 so as to enter the light-receiving device 942 via the corresponding lenses 921 and that light emitted from the light-emitting device 941 is incident on the mirrors 912 via the corresponding lenses 921 so as to be reflected by the mirrors 912 to enter the optical waveguides 911.

Methods of manufacturing an optical waveguide module include passive mounting and active mounting. According to passive mounting, alignment marks are formed on optical waveguides, a light-emitting device, and a light-receiving device in advance, and the light-emitting device and the light-receiving device are aligned with and mounted on the optical waveguides using the alignment marks. On the other hand, according to active mounting, a light-emitting device and a light-receiving device are mounted on optical waveguides by causing light from a light source to enter optical waveguides and aligning the light-emitting device and the light-receiving device so that the light-emitting device and the light-receiving are positioned so as to minimize a loss of the amount of light while measuring the amount of light.

According to active mounting, because alignment is performed while measuring the amount of light, it takes time to perform alignment, thus resulting in low productivity and higher manufacturing cost of the optical waveguide module. Accordingly, passive mounting is preferable to manufacture an optical waveguide module at low cost.

In the case of aligning components with reference to the positions of the mirrors 912 without causing light to enter the optical waveguides 911, the part of the mirrors 912 becomes dark, so that the positions of the mirrors 912 are difficult to visually clearly recognize, thus preventing accurate alignment of components.

Therefore, there is a method according to which the positions of the mirrors 912 are detected using light reflected from the mirrors 912 while keeping light entering the optical waveguides 911 through the ferrule 950. According to this method, however, the boundaries of the mirrors 912 become unclear, so that the positions of the mirrors 912 may not be properly recognized, thus making it difficult to accurately align the lens sheet 920 with the optical waveguide sheet 910. The boundaries of the mirrors 912 become unclear because each mirror 912 has a certain size of area so that light is out of focus in some part of the boundary of the mirror 912 although the light is in focus in some part of the mirror 912. Furthermore, the light source of the light entering the optical waveguides 911 is a dedicated light source whose amount of light is not adjustable. Therefore, if light reflected from the mirrors 912 is too strong, strong contrast results to cause scattering light to leak around the boundaries of the mirrors 912, so that strong scattering light makes the boundaries of the mirrors 912 unclear.

Figure 4:
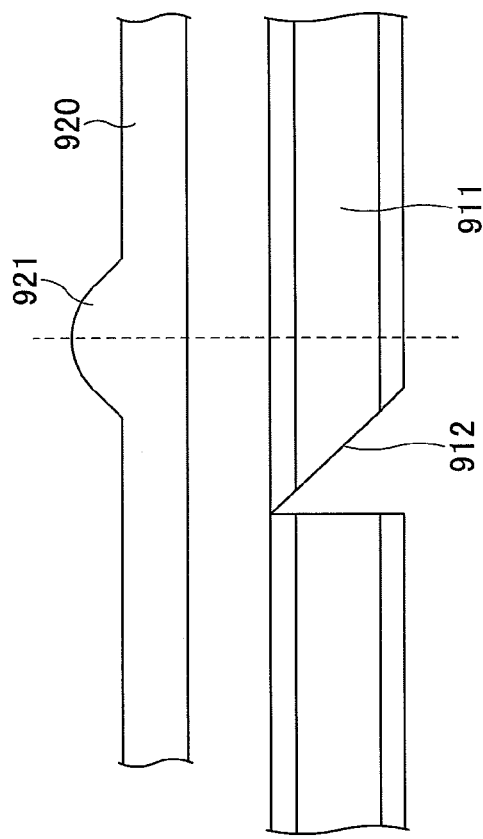
FIG. 4 is a diagram illustrating an optical waveguide sheet and a lens sheet that are out of alignment when being mounted.

Accordingly, when alignment is performed by the above-described method, the positions of the mirrors 912 of the optical waveguides 911 may be misaligned with the positions of the lenses 921 of the lens sheet 920 as illustrated in FIG. 4. When the optical waveguide sheet 910 and the lens sheet 920 as positioned as illustrated in FIG. 4 are joined, light reflected from the mirrors 912 does not enter the lenses 921, and light emitted from the light-emitting device 941 does not enter the mirrors 912. Therefore, the manufactured optical waveguide module is prevented from having desired characteristics.

Accordingly, there is a demand for an optical waveguide module in which the optical waveguide sheet 910, the lens sheet 920, the light-emitting device 941, and the light-receiving device 942 are aligned so that light entering the optical waveguides 911 of the optical waveguide sheet 910 from the ferrule 950 is reflected from the mirrors 912 provided in the optical waveguides 911 so as to enter the light-receiving device 942 through the lenses 921 of the lens sheet 920 and that light emitted from the light-emitting device 941 is made incident on the mirrors 912 through the lenses 921 so as to be reflected from the mirrors 912 to enter the optical waveguides 911.

[a] First Embodiment

Figure 5:
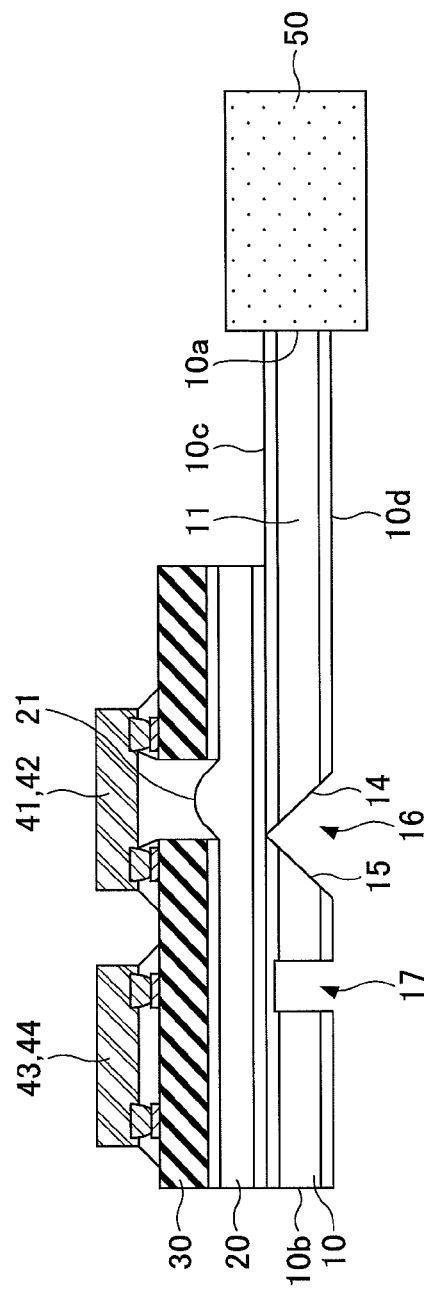
FIG. 5 is a diagram illustrating a structure of an optical waveguide module according to a first embodiment.
Figure 6:
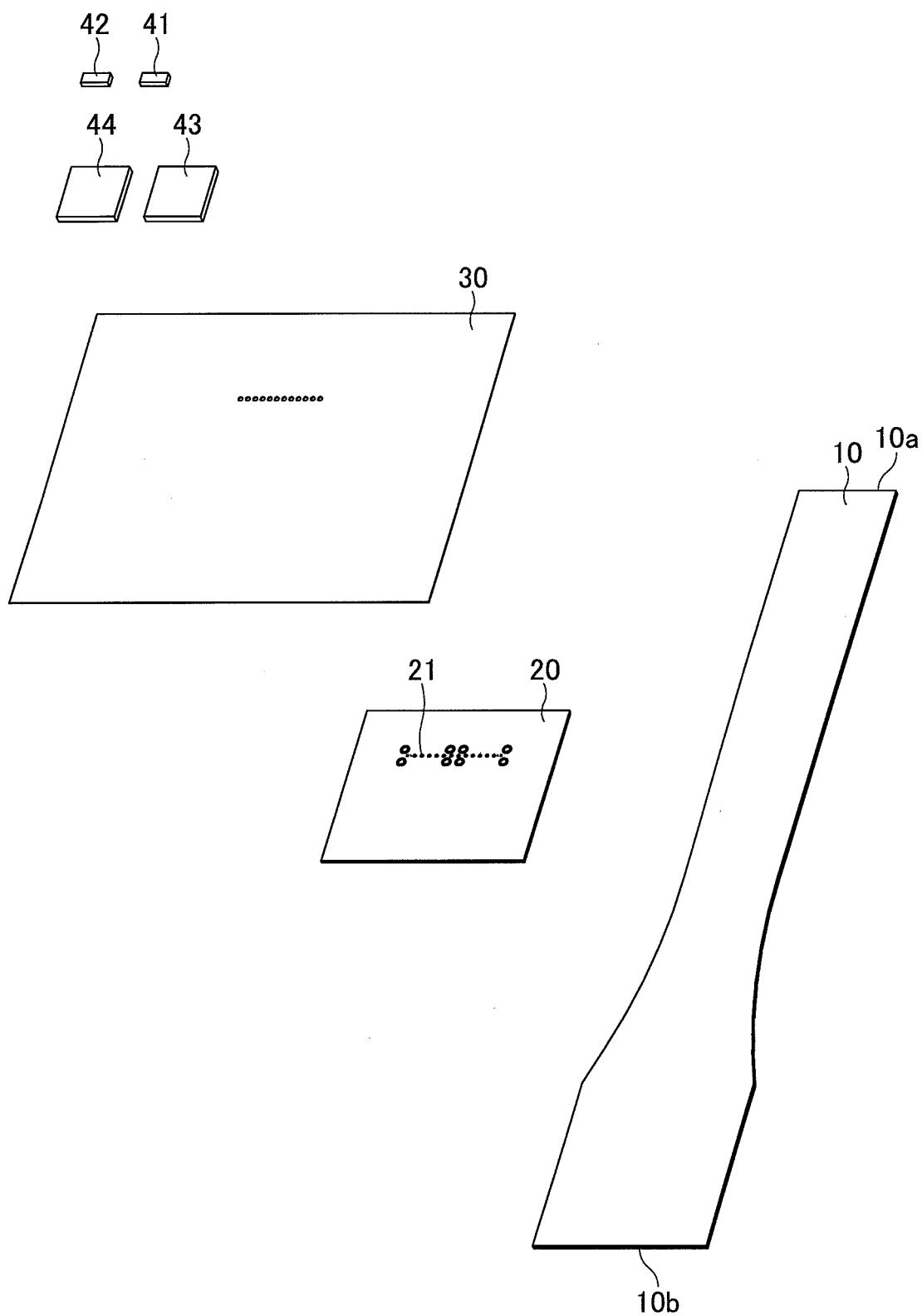
FIG. 6 is an exploded perspective view of the optical waveguide module according to the first embodiment.
Figure 7:
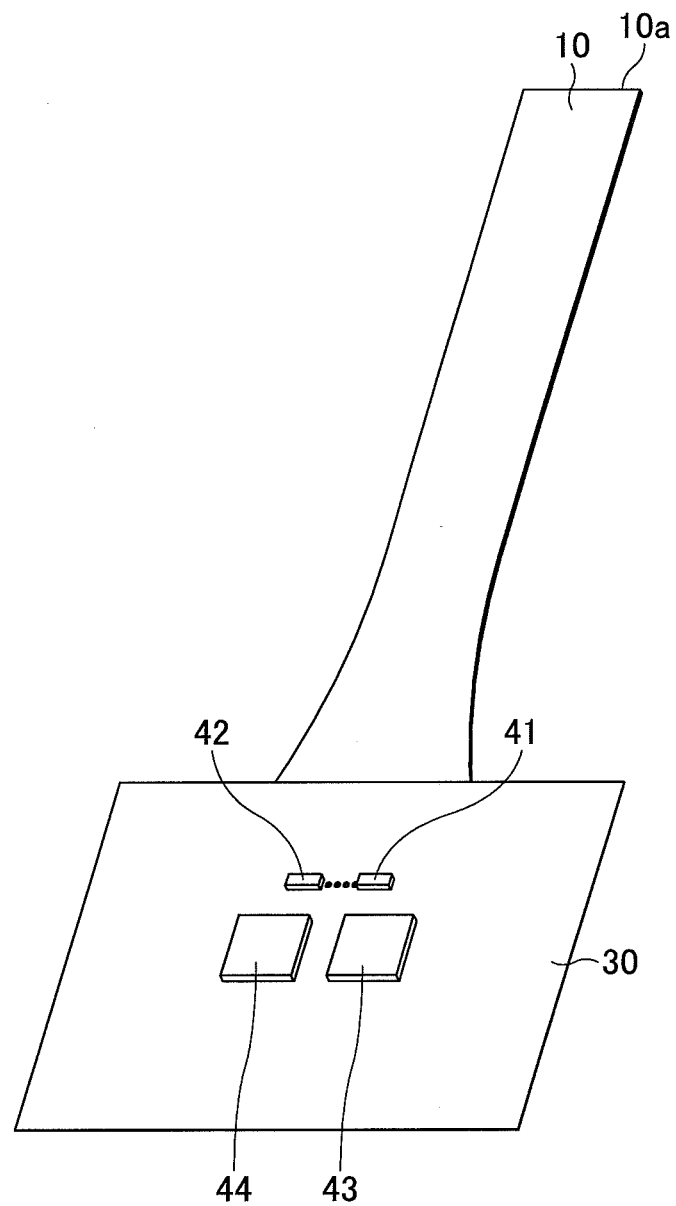
FIG. 7 is a perspective view of the optical waveguide module according to the first embodiment.

Next, a first embodiment is described. Referring to FIGS. 5 through 7, an optical waveguide module according to this embodiment is manufactured by stacking a lens sheet 20 and a flexible substrate 30 in layers on a first surface 10c of an optical waveguide sheet 10. A light-emitting device 41 such as a VCSEL, a light-receiving device 42 such as a PD, a driver 43 that drives the light-emitting device 41, and a TIA 44 that amplifies a signal from the light-receiving device 42 are mounted on the flexible substrate 30 by flip-chip bonding. A ferrule 50 with lenses for inputting light from the outside to optical waveguides 11 and outputting light from the optical waveguides 11 to the outside is connected to a first end 10a of the optical waveguide sheet 10.

Figure 8:
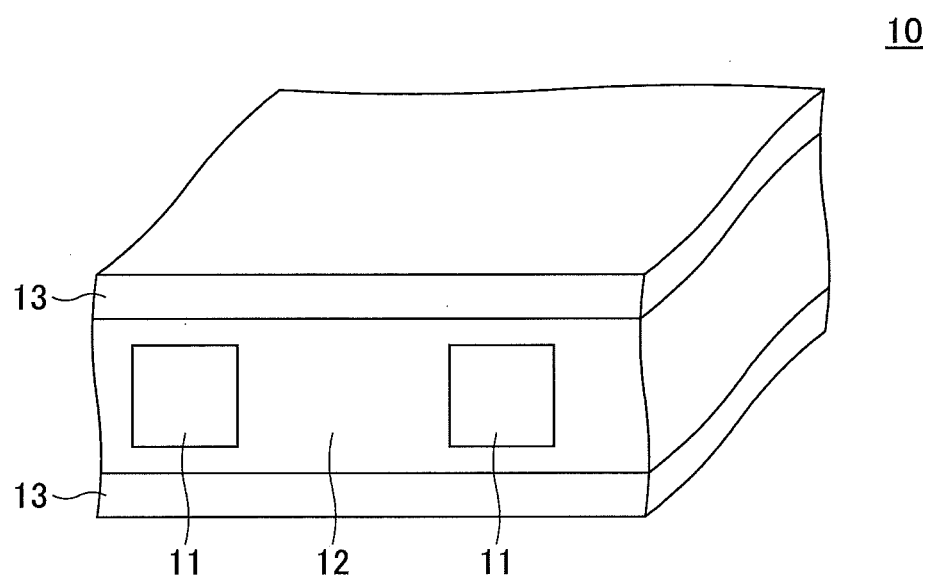
FIG. 8 is a diagram illustrating an optical waveguide in an optical waveguide sheet.

FIG. 8 is a perspective view of the optical waveguide sheet 10. Referring to FIG. 8, cores to serve as the optical waveguides 11 are provided in the optical waveguide sheet 10. The cores are surrounded by cladding 12. A polyimide layer 13 is formed on each of an upper surface and a lower surface of the cladding 12. According to this embodiment, the cores have a refractive index of approximately 1.6, and the cladding 12 has a refractive index of approximately 1.5.

Figure 9:
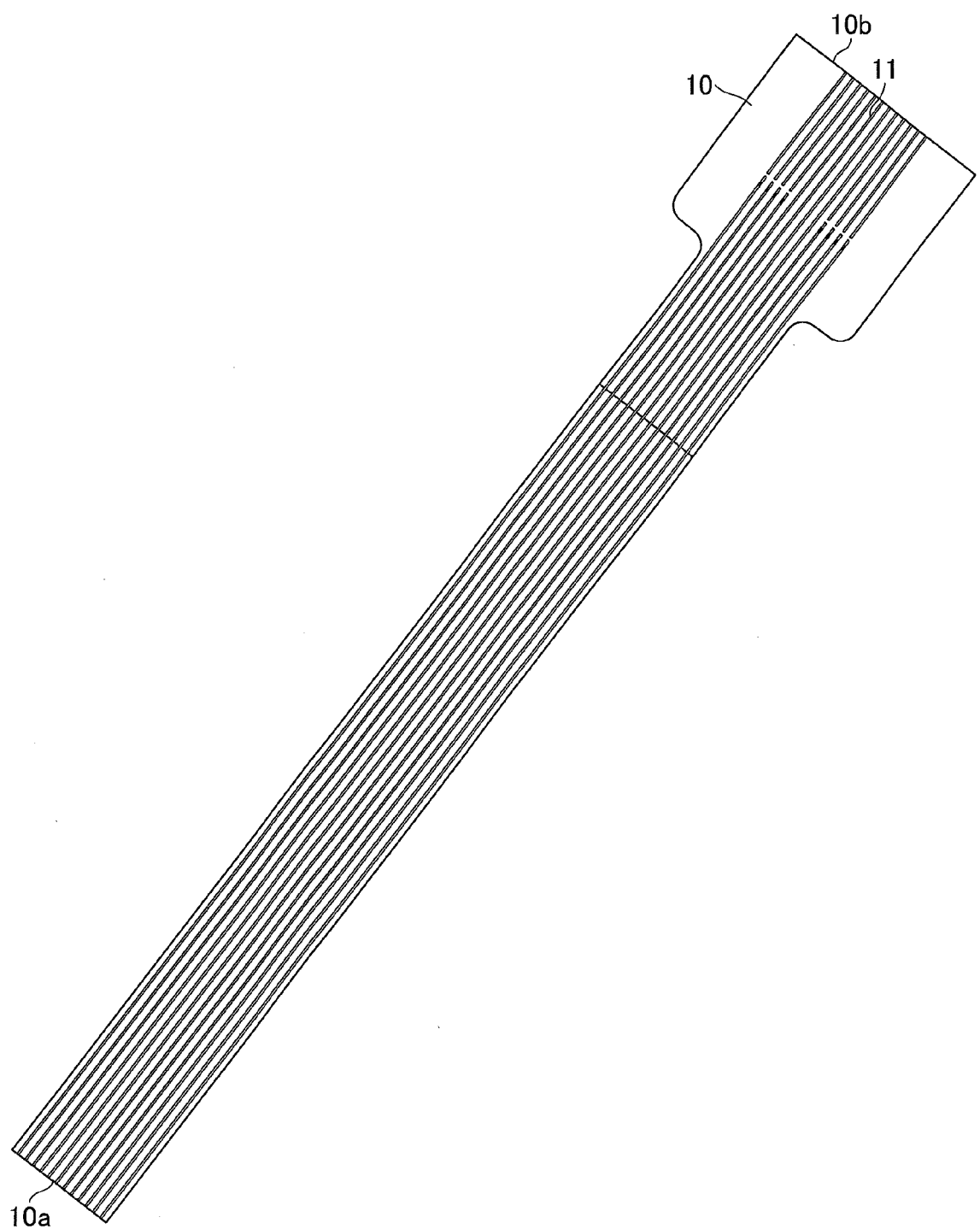
FIG. 9 is a diagram illustrating a structure of the optical waveguide sheet according to the first embodiment.
Figure 10:
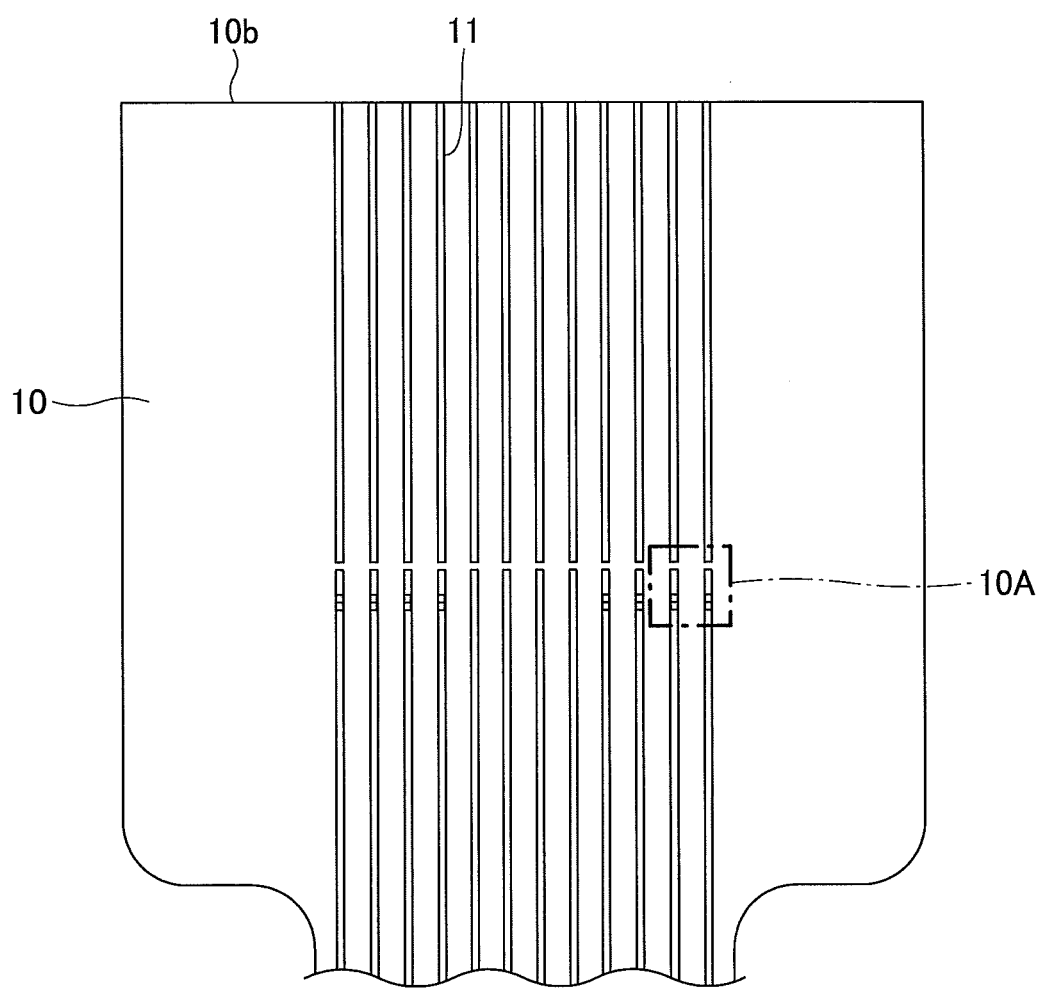
FIG. 10 is an enlarged view of part of the optical waveguide sheet according to the first embodiment.
Figure 11:
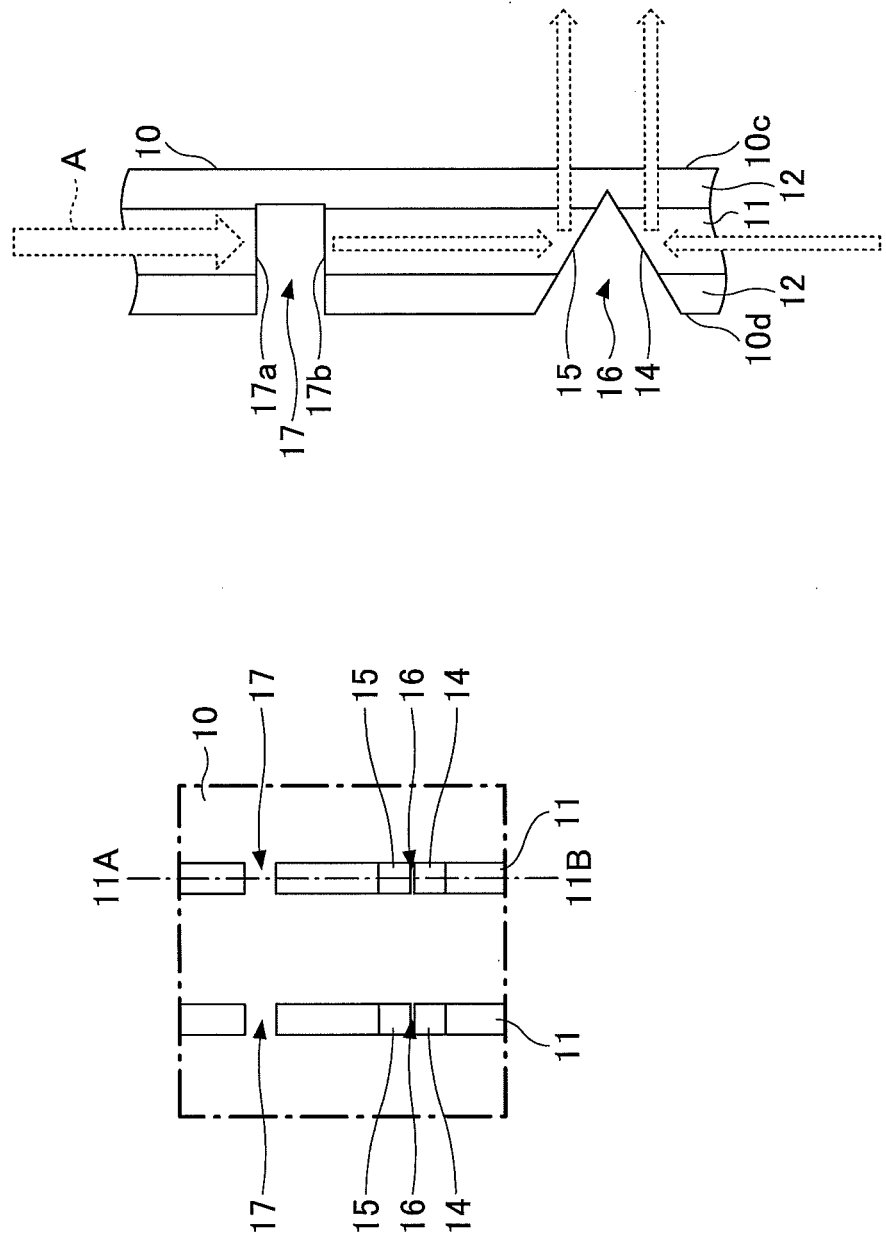
FIGS. 11A and 11B are diagrams illustrating the optical waveguide sheet according to the first embodiment.

Next, the optical waveguide sheet 10 of the optical waveguide module according to this embodiment is described with reference to FIGS. 5, 9, 10, 11A and 11B. FIG. 9 is an overall view of the optical waveguide sheet 10. FIG. 10 is an enlarged view of a second end 10b of the optical waveguide sheet 10 opposite to the first end 10a. FIG. 11A is an enlarged view of part of the optical waveguide sheet 10 enclosed with a one-dot chain line 10A in FIG. 10. FIG. 11B is a cross-sectional view of the part of the optical waveguide sheet 10 taken along a plane including a one-dot chain line 11A-11B in FIG. 11A.

Referring to FIGS. 5, 11A and 11B, grooves 16 and slits 17 are provided in the optical waveguide sheet 10. An input/output mirror 14 and an alignment mirror 15 are formed in each of the grooves 16. The alignment mirror 15 is used for alignment of components such as the optical waveguide sheet 10, the lens sheet 20, the light-emitting device 41, and the light-receiving device 42 in the optical waveguide module, and serves as a mark for recognizing the position of the input/output mirror 14. In the following, for convenience of description, the grooves 16 and the slits 17 are described, taking one of the identical optical waveguides 11 as illustrated in FIG. 11A as an example.

The groove 16 is formed by forming two inclined surfaces on a second surface 10d of the optical waveguide sheet 10 that is opposite to the first surface 10c. A surface forming the input/output mirror 14 and a surface forming the alignment mirror 15 are substantially at right angles. The slit 17 is formed by removing part of the optical waveguide 11 from the second surface 10d at a position closer to the second end 10b than is the groove 16. Accordingly, the slit 17 is formed between the second end 10b and the groove 16.

The groove 16 and the slit 17 are formed by removing part of the cladding 12 and part of the optical waveguide 11 by laser processing using an excimer laser or the like. The surfaces of the optical waveguide 11 formed by the laser processing are flat so as to serve as mirrors. The groove 16 and the slit 17 may also be formed by dicing or the like.

According to this embodiment, light entering from the first end 10a of the optical waveguide sheet 10 is reflected by the input/output mirror 14, and light entering from the second end 10b of the optical waveguide sheet 10 is reflected by the alignment mirror 15.

Referring to FIG. 5, the input/output mirror 14 causes light emitted from the light-emitting device 41 to enter the optical waveguide 11 or causes light in the optical waveguide 11 to enter the light-receiving device 42. The input/output mirror 14 is formed by forming a surface inclined substantially at 45° to the second surface 10d of the optical waveguide sheet 10. The lens sheet 20 includes lenses 21, which are positioned between the optical waveguide sheet 10 and the flexible substrate 30.

According to this embodiment, when the optical waveguide sheet 10 and the lens sheet 20 are joined, light is caused to enter the optical waveguide 11 from the second end 10b of the optical waveguide sheet 10 as indicated by a broken-line arrow A in FIG. 11B. The light entering the optical waveguide 11 from the second end 10b exits from the optical waveguide 11 through a first surface 17a of the slit 17, and reenters the optical waveguide 11 through a second surface 17b of the slit 17. Because the core and the cladding 12 are absent in the slit 17, the light passing through the optical waveguide 11 and exiting from the first surface 17a is diffused in the slit 17, and part of the diffused light reenters the optical waveguide 11 through the second surface 17b. The light reentering the optical waveguide 11 through the second surface 17b is weaker than the light exiting from the first surface 17a. Therefore, by providing the slit 17, it is possible to reduce the amount of light made incident on the alignment mirror 15.

The light that reenters the optical waveguide 11 through the second surface 17b and propagates through the optical waveguide 11 is reflected by the alignment mirror 15. Because the light made incident on the alignment mirror 15 is reduced in amount by passing through the slit 17, it is possible to reduce scattering light that leaks around the boundary of the alignment mirror 15, so that it is possible to reduce contrast at the time of capturing an image of the alignment mirror 15. Accordingly, the boundary of the alignment mirror 15 is clarified.

Thus, according to the optical waveguide module of this embodiment, it is possible to perform alignment using light reflected from the alignment mirror 15, and the lens sheet 20 can be accurately aligned with the optical waveguide sheet 10.

Thus, according to this embodiment, it is possible to align the optical waveguide sheet 10, the lens sheet 20, the light-emitting device 41, and the light-receiving device 42 so that light entering the optical waveguide 11 is reflected by the input/output mirror 14 so as to enter the light-receiving device 42 through the lens 21 or that light emitted from the light-emitting device 41 is made incident on the input/output mirror 14 through the lens 21 so as to be reflected from the input/output mirror 14 to enter the optical waveguide 11. By joining the optical waveguide sheet 10, the lens sheet 20, the light-emitting device 41, and the light-receiving device 42 that are thus aligned, it is possible to manufacture an optical waveguide module in which the optical waveguide sheet 10, the lens sheet 20, the light-emitting device 41, and the light-receiving device 42 are positioned as desired.

Figure 12:
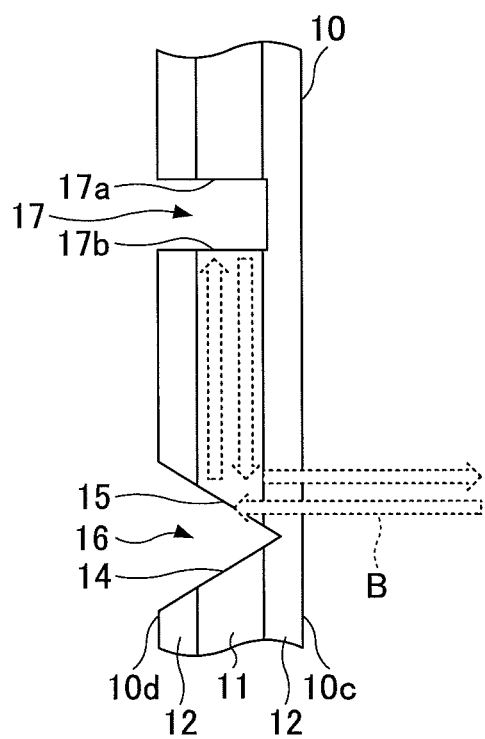
FIG. 12 is a diagram illustrating the optical waveguide sheet according to the first embodiment.

The above description is given of the case of performing alignment by determining the position of the alignment mirror 15 by causing light to enter the optical waveguide 11 through the second end 10b of the optical waveguide sheet 10 as indicated by the broken-line arrow A in FIG. 11B. Alternatively, as illustrated in FIG. 12, light may be caused to enter the optical waveguide 11 from the first surface 10c of the optical waveguide sheet 10 to which the lens sheet 20 is joined as indicated by a broken-line arrow B. The light entering the optical waveguide 11 from the first surface 10c of the optical waveguide sheet 10 as indicated by the broken-line arrow B is reflected by the alignment mirror 15 so as to propagate through the optical waveguide 11, and is thereafter reflected by the second surface 17b, which serves as the interface between the optical waveguide 11 and the slit 17, so as to again propagate through the optical waveguide 11 to be reflected by the alignment mirror 15 to the side from which the light has entered the optical waveguide 11. In this case, a light source and a camera for image recognition may be placed at the same position, so that it is possible to employ an image recognition camera with a light. According to the image recognition camera with a light, it is possible to adjust the amount of light of a light source. Accordingly, by adjusting the amount of light entering the optical waveguide 11, it is possible to adjust the amount of light reflected from the alignment mirror 15 to a desired amount.

[b] Second Embodiment

Figure 13:
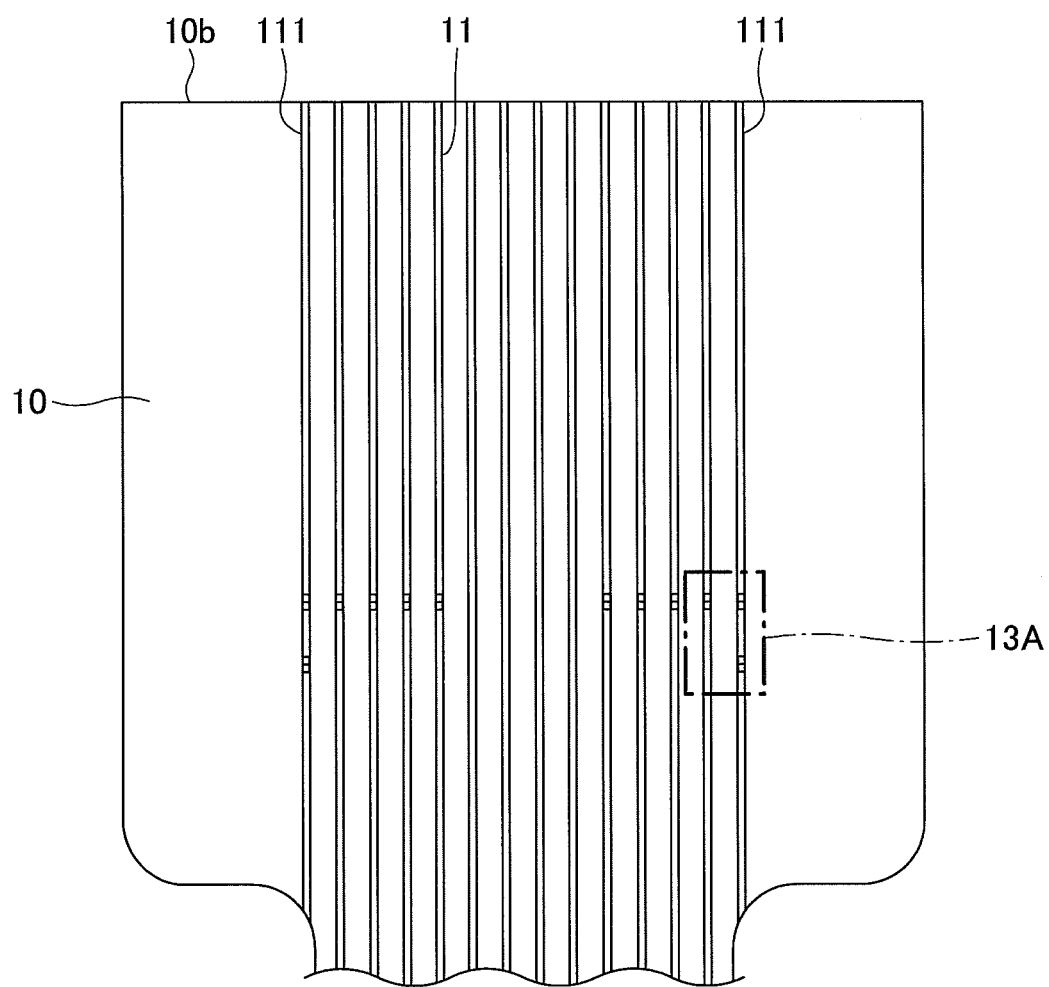
FIG. 13 is an enlarged view of part of the optical waveguide sheet according to a second embodiment.
Figure 14A:
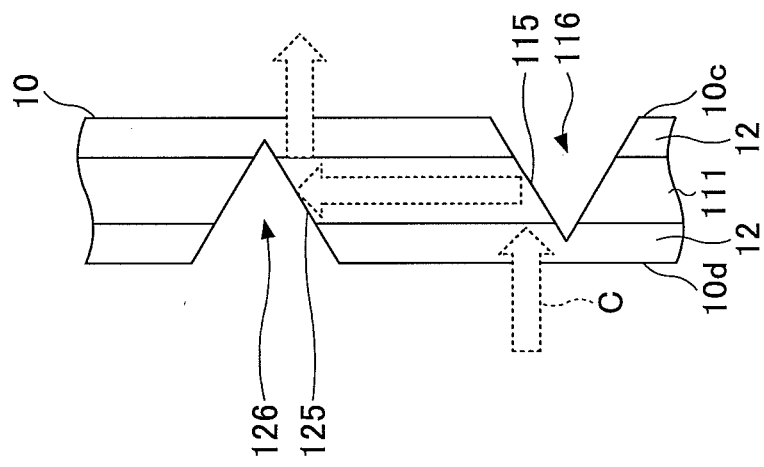
FIGS. 14A and 14B are diagrams illustrating the optical waveguide sheet according to the second embodiment.
Figure 14B:
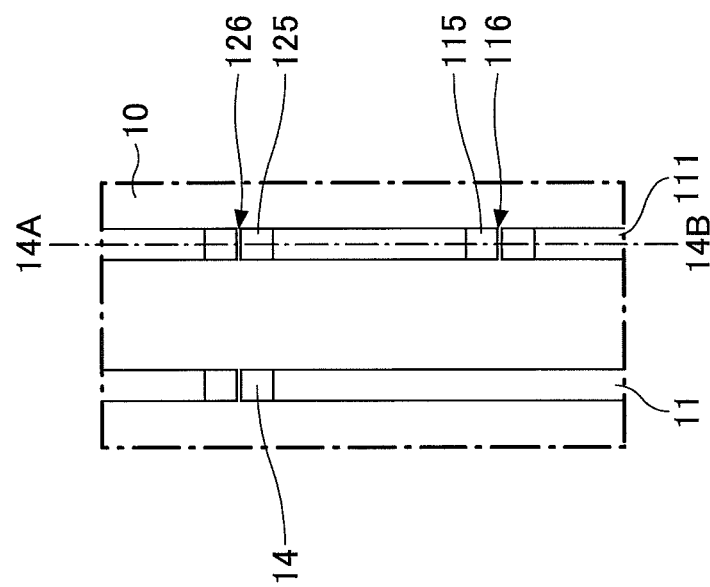

Next, a second embodiment is described. FIG. 13 is an enlarged view of the second end 10b of the optical waveguide sheet 10 according to this embodiment. FIG. 14A is an enlarged view of part of the optical waveguide sheet 10 enclosed with a one-dot chain line 13A in FIG. 13. FIG. 14B is a cross-sectional view of the part of the optical waveguide sheet 10 taken along a plane including a one-dot chain line 14A-14B in FIG. 14A.

According to an optical waveguide module of this embodiment, dummy cores 111 that are not used as optical waveguides for propagating optical signals are provided in the optical waveguide sheet 10. Referring to FIGS. 14A and 14B, a first groove 116 forming a first alignment mirror 115 and a second groove 126 forming a second alignment mirror 125 are provided in each dummy core 111. Specifically, the first groove 116 is formed on a portion of the first surface 10c of the optical waveguide sheet 10 where the dummy core 111 is provided, and the second groove 126 is formed on a portion of the second surface 10d of the optical waveguide sheet 10 where the dummy core 111 is provided.

The first groove 116 is formed by forming, on the first surface 10c of the optical waveguide sheet 10, a groove whose surface forming the first alignment mirror 115 is substantially at 45° to the first surface 10c. The second groove 126 is formed by forming, on the second surface 10d of the optical waveguide sheet 10, a groove whose surface forming the second alignment mirror 116 is substantially at 45° to the second surface 10d. Accordingly, the surface forming the first alignment mirror 115 and the surface forming the second alignment mirror 125 are formed substantially parallel to each other. The first groove 116 and the second groove 126 are formed by removing the cladding 12 and the dummy core 111 by laser processing using an excimer laser or the like or dicing. The formed inclined surfaces of the dummy core 111 are flat so as to serve as mirrors. Furthermore, because the first groove 116 and the second groove 126 are formed by the same processing as the input/output mirrors 14 formed in the optical waveguides 11, it is possible to form the first groove 116 and the second groove 126 with high accuracy.

According to this embodiment, light enters the optical waveguide sheet 10 from the second surface 10d at a position where the first alignment mirror 115 is formed as indicated by a broken-line arrow C in FIG. 14B. The entering light is reflected by the first alignment mirror 115 and the second alignment mirror 125 so as to exit from the first surface 10c of the optical waveguide sheet 10. Components of the optical waveguide module are aligned by determining the position of the second alignment mirror 125 using light exiting from the first surface 10c of the optical waveguide sheet 10. Because a common light source such as an LED may be used as a light source of the light entering to the optical waveguide sheet 10, the amount of light is adjustable. When the amount of light is thus adjustable, it is also possible to reduce light reflected from the second alignment mirror 125. Therefore, the boundary of the second alignment mirror 125 is clarified by weakened contrast at the second alignment mirror 125, so that it is possible to accurately align the optical waveguide sheet 10 and the lens sheet 20.

Figure 15:
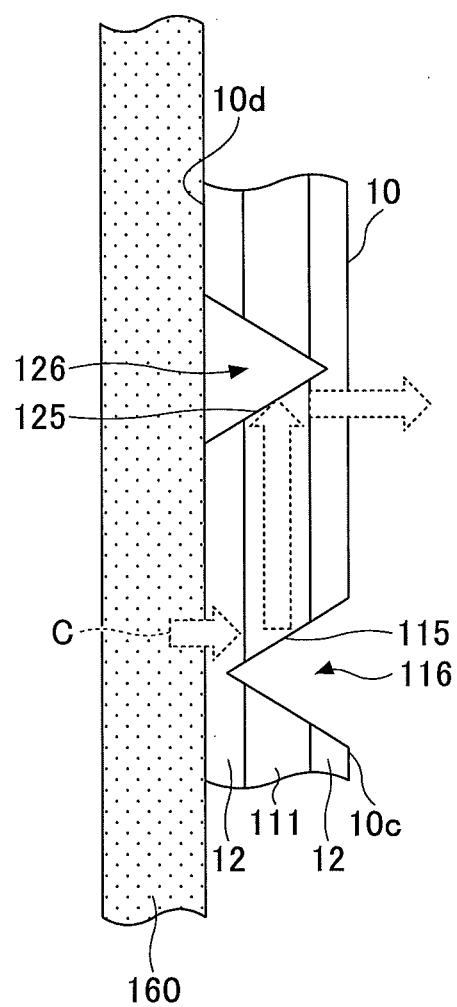
FIG. 15 is a diagram illustrating the optical waveguide sheet according to the second embodiment.

According to this embodiment, as illustrated in FIG. 15, a planar light source 160 may be provided on the second surface 10d of the optical waveguide sheet 10, so that light emitted from the planar light source 160 may be reflected by the first alignment mirror 115 so as to propagate through the dummy core 111 to be reflected by the second alignment mirror 125. By thus employing the planar light source 160, it is possible to easily make light incident on the first alignment mirror 115.

Figure 16:
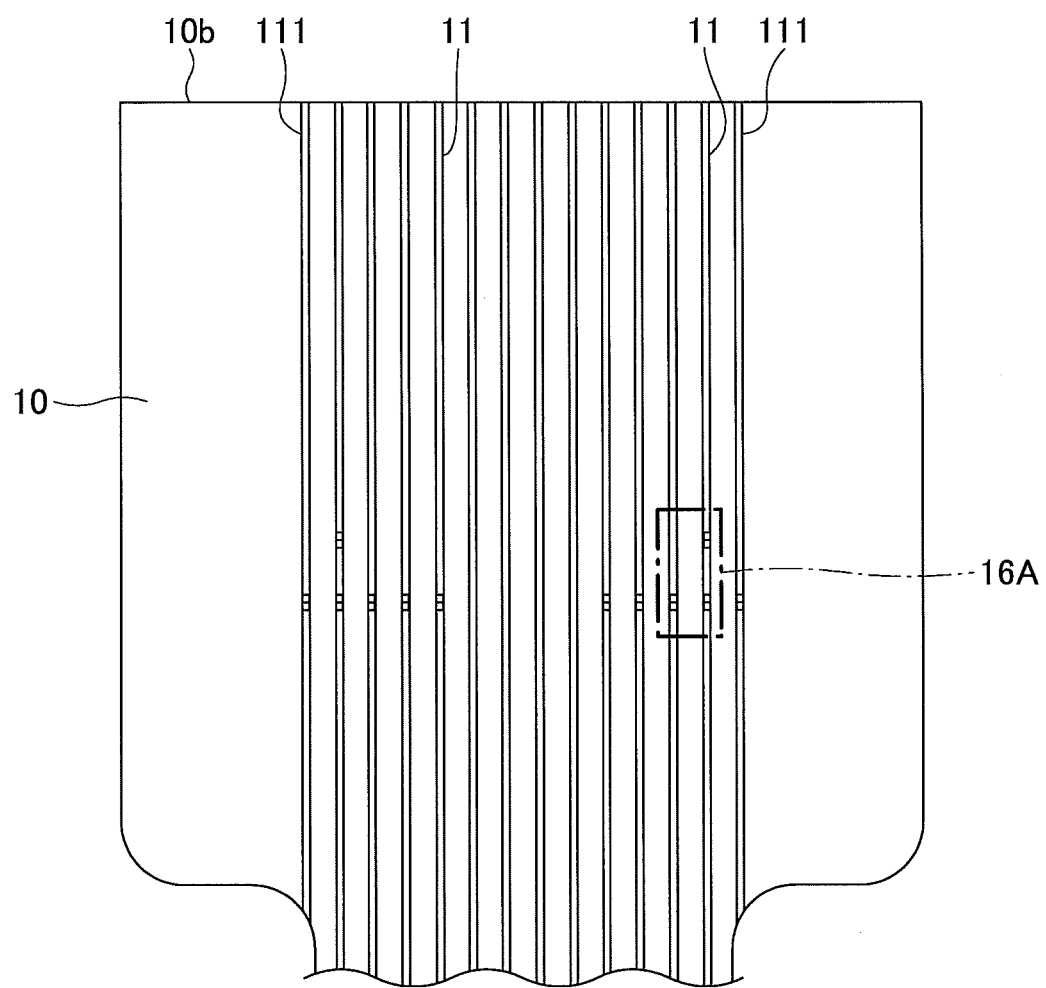
FIG. 16 is an enlarged view of part of the optical waveguide sheet according to the second embodiment.
Figure 17A:
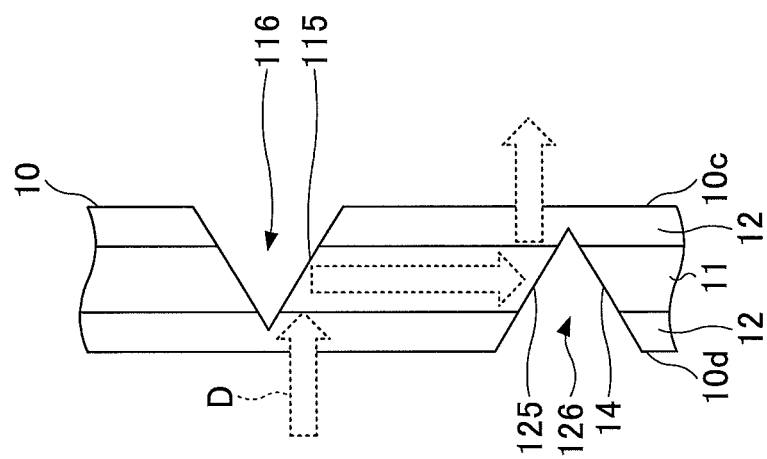
FIGS. 17A and 17B are diagrams illustrating the optical waveguide sheet according to the second embodiment.
Figure 17B:
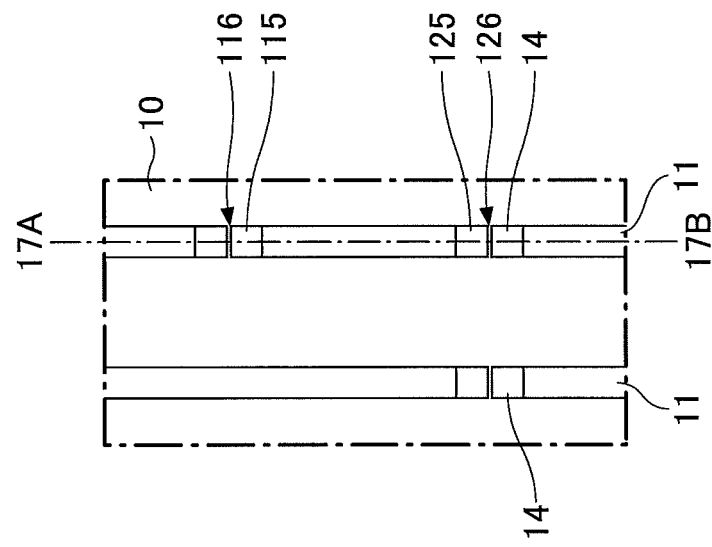

Furthermore, according to the optical waveguide module of this embodiment, the first and second alignment mirrors 115 and 125 may alternatively be formed in at least some of the optical waveguides 11 provided in the optical waveguide sheet 10 as illustrated in FIGS. 16, 17A and 17B. FIG. 16 is an enlarged view of the second end 10b of the optical waveguide sheet 10. FIG. 17A is an enlarged view of part of the optical waveguide sheet 10 enclosed with a one-dot chain line 16A in FIG. 16. FIG. 17B is a cross-sectional view of the part of the optical waveguide sheet 10 taken along a plane including a one-dot chain line 17A-17B in FIG. 17A. Referring to FIG. 17A, the first alignment mirror 115 and the second alignment mirror 125 are formed in the optical waveguide 11 on the right side for propagating an optical signal.

Referring to FIG. 17, the second groove 126 is formed by two inclined surfaces, one of which forms the second alignment mirror 125 and the other of which forms the input/output mirror 14. Furthermore, the second groove 126 is formed so that the surface forming the input/output mirror 14 and the surface forming the second alignment mirror 125 are substantially at right angles. Furthermore, the first groove 116 is formed between the second end 10b of the optical waveguide sheet 10 and the second groove 126. Accordingly, in the optical waveguide sheet 10, the first alignment mirror 115 and the second alignment mirror 125 are formed at positions closer to the second end 10b of the optical waveguide sheet 10 than is the input/output mirror 14.

In this case, light enters the optical waveguide sheet 10 so as to be reflected from the first alignment mirror 115 and the second alignment mirror 125 to exit from the first surface 10c of the optical waveguide sheet 10 as indicated by a broken-line arrow D in FIG. 17B.

The second embodiment is the same as the first embodiment except for the configuration described above.

[c] Third Embodiment

Figure 18:
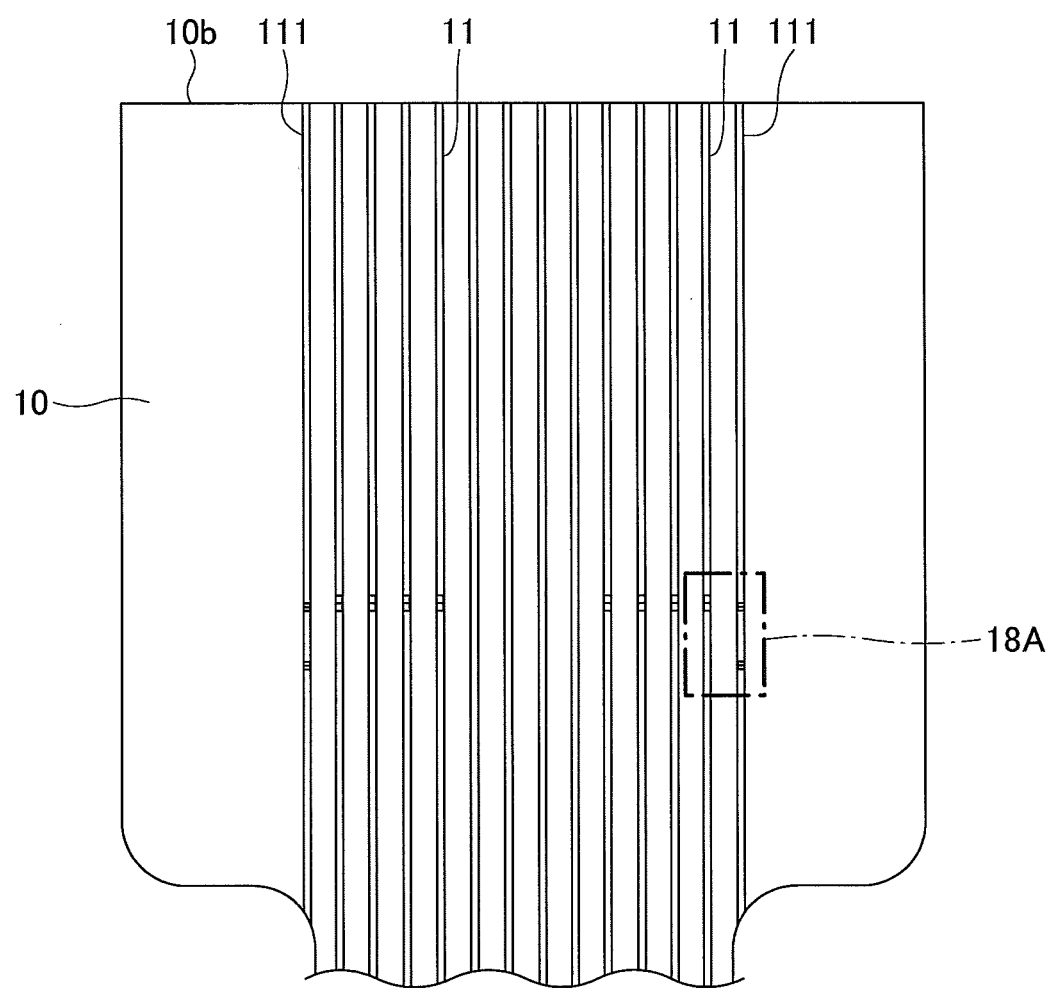
FIG. 18 is an enlarged view of part of the optical waveguide sheet according to a third embodiment.

Next, a third embodiment is described. FIG. 18 is an enlarged view of the second end 10b of the optical waveguide sheet 10. FIG. 19A is an enlarged view of part of the optical waveguide sheet 10 enclosed with a one-dot chain line 18A in FIG. 18. FIG. 19B is a cross-sectional view of the part of the optical waveguide sheet 10 taken along a plane including a one-dot chain line 19A-19B in FIG. 19A.

According to an optical waveguide module of this embodiment, dummy cores 111 that are not used as optical waveguides are provided in the optical waveguide sheet 10 as illustrated in FIGS. 18, 19A and 19B. A first groove 216 and a second groove 226 are provided on a portion of the first surface 10c of the optical waveguide sheet 10 where each dummy core 111 is provided, and a third groove 236 and a fourth groove 246 are provided on the second surface 10d of part of the optical waveguide sheet 10 where each dummy core 111 is provided as illustrated in FIGS. 19A and 19B.

Referring to FIG. 19B, the first groove 216 provided on the first surface 10c and the third groove 236 provided on the second surface 10d are formed at the same position across the dummy core 111. Likewise, the second groove 226 provided on the first surface 10c and the fourth groove 246 provided on the second surface 10d are formed at the same position across the dummy core 111. The second groove 226 and the fourth groove 246 are formed at a position closer to the second end 10b of the optical waveguide sheet 10 than are the first groove 216 and the third groove 236.

Each of the first groove 216 and the second groove 226 is formed by forming a groove from the first surface 10c of the optical waveguide sheet 10 to a substantial center of the dummy core 111. Furthermore, each of the third groove 236 and the fourth groove 246 is formed by forming a groove from the second surface 10d of the optical waveguide sheet 10 to a substantial center of the dummy core 111.

The first groove 216, the second groove 226, the third groove 236, and the fourth groove 246 are formed by removing part of the cladding 12 and the dummy core 111 by laser processing. The method of forming each of the grooves 216, 226, 236 and 246 is not limited to laser processing. Furthermore, the surfaces of the dummy core 111 formed by groove processing are flat so as to serve as mirrors.

According to this embodiment, a surface of the first groove 216, a surface of the second groove 226, a surface of the third groove 236, and a surface of the fourth groove 246 form alignment mirrors.

According to this embodiment, the first groove 216 and the third groove 236 are formed at the same position, and the second groove 226 and the fourth groove 246 are formed at the same position. Therefore, light entering the optical waveguide sheet 10 from the first surface 10c can exit from either the first surface 10c or the second surface 10d. Likewise, light entering the optical waveguide sheet 10 from the second surface 10d can exit from either the first surface 10c or the second surface 10d.

Therefore, according to this embodiment, it is possible to cause light to exit from either the first surface 10c or the second surface 10d of the optical waveguide sheet 10 in the manufacture of the optical waveguide module.

The third embodiment is the same as the first embodiment except for the configuration described above.

[d] Fourth Embodiment

Figure 20:
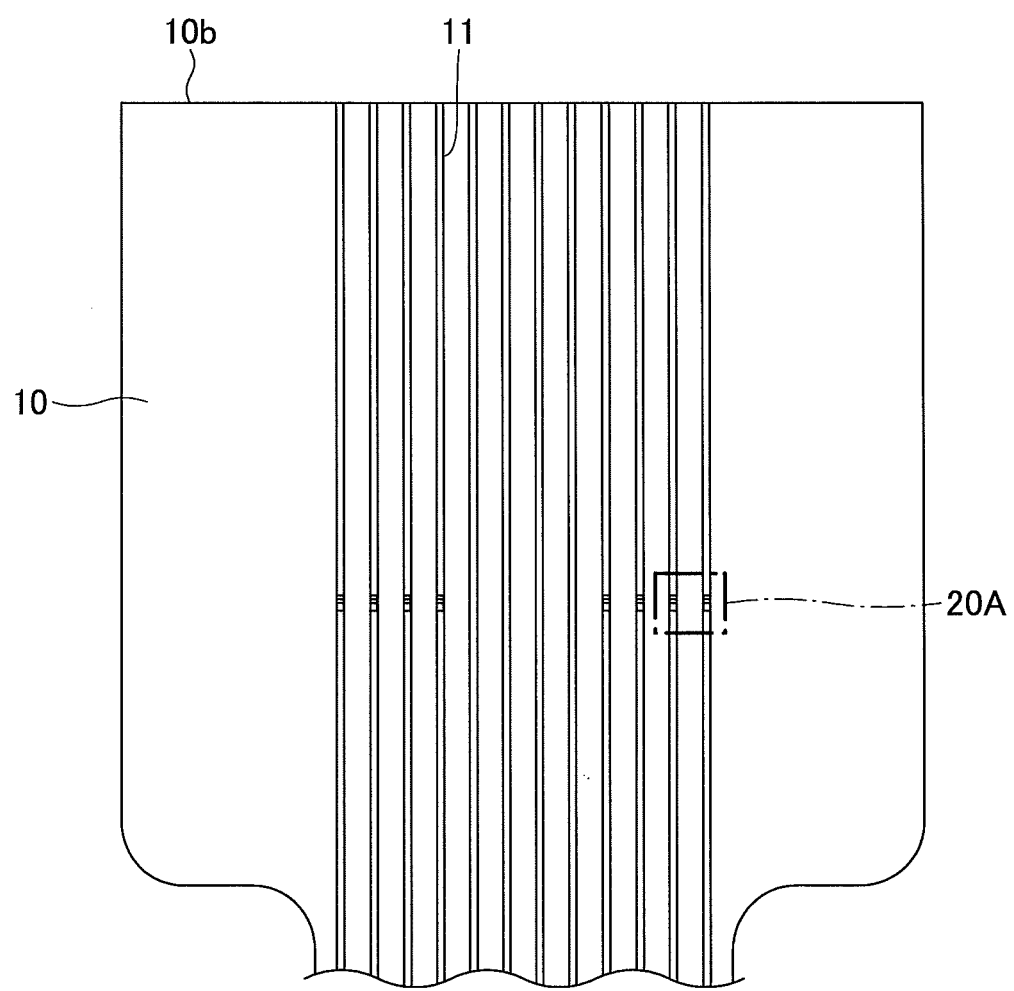
FIG. 20 is an enlarged view of part of the optical waveguide sheet according to a fourth embodiment.
Figure 21:
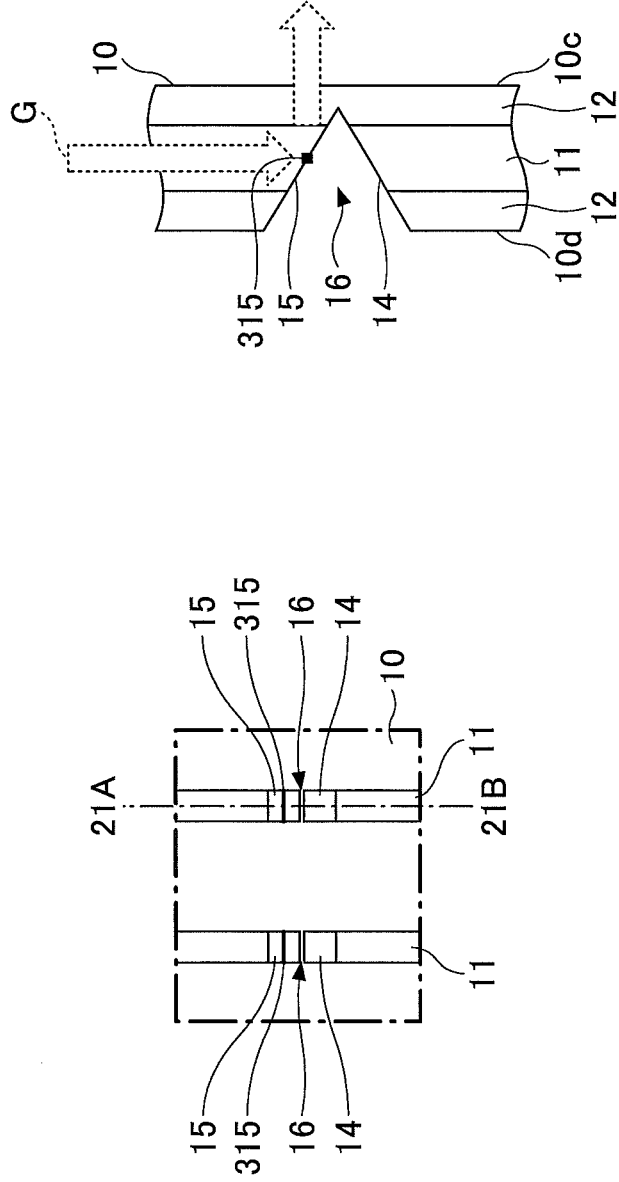
FIGS. 21A and 21B are diagrams illustrating the optical waveguide sheet according to the fourth embodiment.

Next, a fourth embodiment is described. FIG. 20 is an enlarged view of the second end 10b of the optical waveguide sheet 10. FIG. 21A is an enlarged view of part of the optical waveguide sheet 10 enclosed with a one-dot chain line 20A in FIG. 20. FIG. 21B is a cross-sectional view of the part of the optical waveguide sheet 10 taken along a plane including a one-dot chain line 21A-21B in FIG. 21A.

According to an optical waveguide module of this embodiment, some of the optical waveguides 11 are provided with the groove 16 in which the input/output mirror 14 and the alignment mirror 15 are formed and a recognition mark 315 at the center of the alignment mirror 15 as illustrated in FIGS. 20, 21A and 21B.

The groove 16 is formed by forming a groove from the second surface 10d of the optical waveguide sheet 10 so that a surface forming the input/output mirror 14 and a surface forming the alignment mirror 15 are substantially at right angles. The alignment mirror 15 is formed at a position closer to the second end 10b of the optical waveguide sheet 10 than is the input/output mirror 14.

The groove 16 is formed by removing the cladding 12 and the optical waveguide 11 by, for example, laser processing. Furthermore, the recognition mark 315 is formed by laser processing or the like at the center of a surface of the alignment mirror 15. Referring to FIG. 21A, the recognition mark 315 is linearly formed in a width direction of the optical waveguide 11.

According to this embodiment, light entering the optical waveguide 11 through the first end 10a is reflected by the input/output mirror 14, and light entering the optical waveguide 11 through the second end 10b is reflected by the alignment mirror 15.

Light is scattered on part of the alignment mirror 15 where the recognition mark 315 is formed. Accordingly, the part of the alignment mirror 15 where the recognition mark 315 is formed becomes dark, so that it is possible to recognize a position of the recognition mark 315 from the second surface 10d of the optical waveguide sheet 10. Because the recognition mark 315 is formed at the center of the alignment mirror 15, the center of the alignment mirror 15 can be determined by focusing on the recognition mark 315, so that it is possible to increase the accuracy of mounting.

According to this embodiment, when the optical waveguide sheet 10 and the lens sheet 20 are joined, light enters the optical waveguide 11 through the second end 10b of the optical waveguide sheet 10 as indicated by a broken-line arrow G in FIG. 21B. The light that has entered the optical waveguide 11 is reflected by the alignment mirror 15. Because the recognition mark 315 is formed at the center of the alignment mirror 15, the center of the alignment mirror 15 can be recognized. As a result, it is possible to accurately align the lens sheet 20 with the optical waveguide sheet 10.

The fourth embodiment is the same as the first embodiment except for the configuration described above.

[e] Fifth Embodiment

Figure 22:
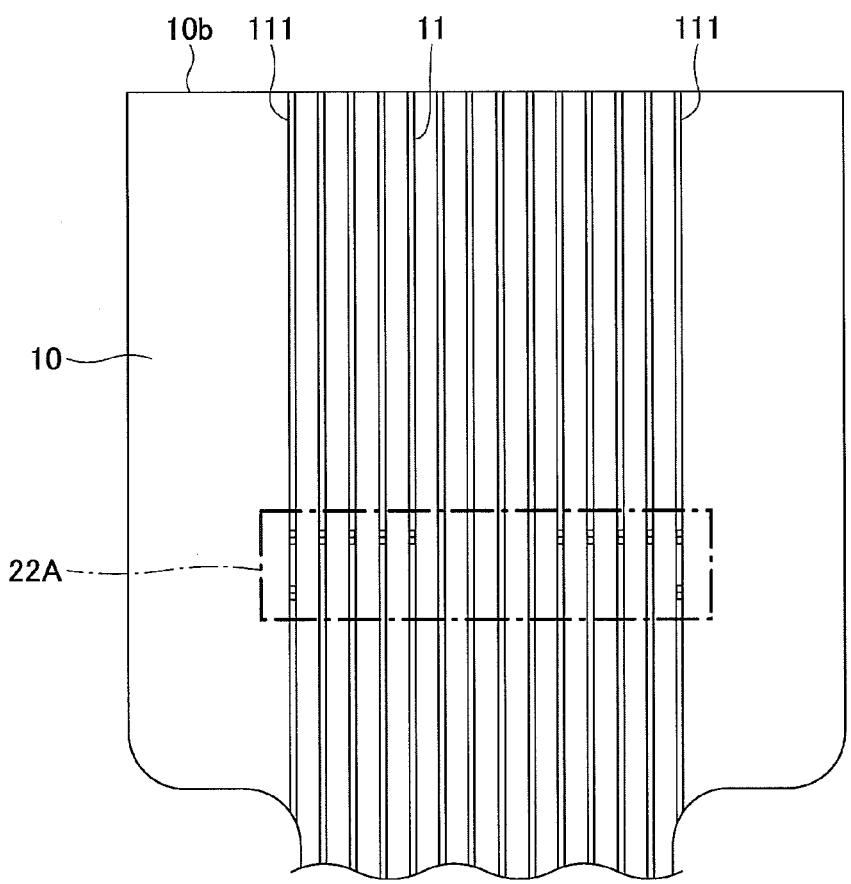
FIG. 22 is an enlarged view of part of the optical waveguide sheet according to a fifth embodiment.
Figure 23:
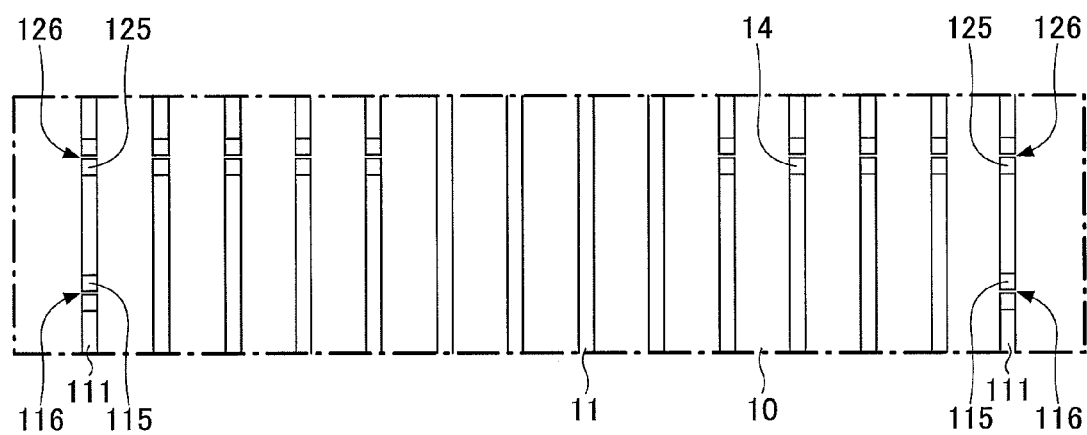
FIG. 23 is a diagram illustrating the optical waveguide sheet according to the fifth embodiment.

Next, a fifth embodiment is described. FIG. 22 is an enlarged view of the second end 10b of the optical waveguide sheet 10. FIG. 23 is an enlarged view of part of the optical waveguide sheet 10 enclosed with a one-dot chain line 22A in FIG. 22.

According to an optical waveguide module of this embodiment, as illustrated in FIGS. 22 and 23, the optical waveguides 11 are arranged in the optical waveguide sheet 10 side by side between the two dummy cores 111. As illustrated in FIG. 23, the first groove 116 including the first alignment mirror 115 and the second groove 126 including the second alignment mirror 125 according to the second embodiment are provided in each dummy core 111.

According to this embodiment, the first alignment mirror 115 and the second alignment mirror 125 are formed in each of the dummy cores 111 that are provided along each side of the optical waveguides 11. Because the alignment mirrors 115 and 125 are formed in the dummy cores 111 provided one on each side of the optical waveguides 11, it is possible to determine the positions of the alignment mirrors 115 distant from each other and the positions of the alignment mirrors 125 distant from each other, so that the accuracy of alignment can be further increased.

The fifth embodiment is the same as the second embodiment except for the configuration described above. Furthermore, the fifth embodiment may be applied to the optical waveguide module according to the other embodiments. For example, while the dummy cores 111 are provided one on each side of the optical waveguides 11 in FIGS. 22 and 23, the first groove 116 and the second groove 126 may be formed in each of the outermost optical waveguides 11 for transmitting optical signals. Furthermore, the first grooves 116 and the second grooves 126 can be formed in all the optical waveguides 11 including the dummy cores 111.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An optical waveguide module, comprising:
   an optical waveguide sheet including a plurality of optical waveguides;
   a light-emitting device positioned over a surface of the optical waveguide sheet;
   a light-receiving device positioned over the surface of the optical waveguide sheet; and
   a mirror formed in at least one of the plurality of optical waveguides, the mirror being configured to reflect light propagating through the optical waveguide toward the surface of the optical waveguide sheet,
   wherein the mirror includes a recognition mark and is configured to scatter the light propagating through the optical waveguide at the recognition mark.

2. The optical waveguide module as claimed in claim 1, wherein
   the plurality of optical waveguides includes a plurality of cores,
   at least one core among the plurality of cores includes an inclined surface forming the mirror, and
   the recognition mark is at a center of the inclined surface.

* * * * *